(No Model.)
J. H. KNOWLES & J. K. PROCTOR.
DRYING MACHINE.
No. 410,110. Patented Aug. 27 1889.
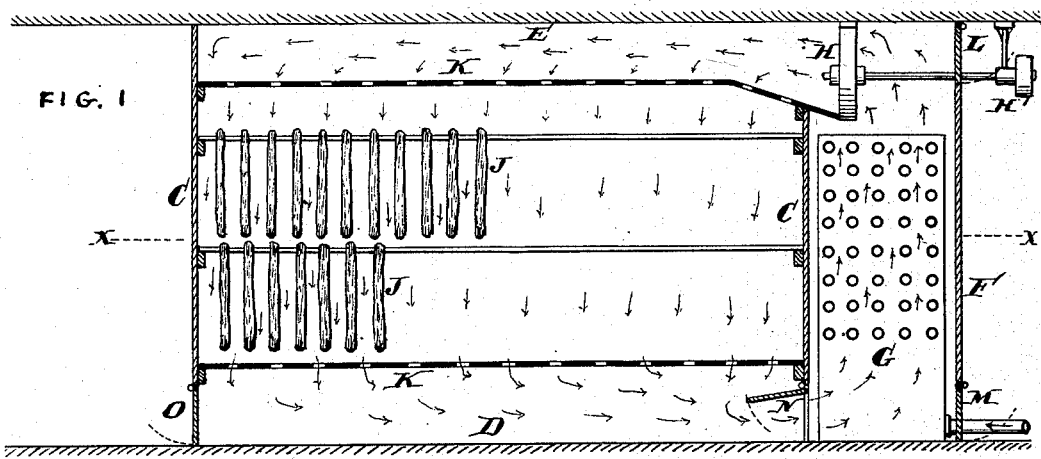
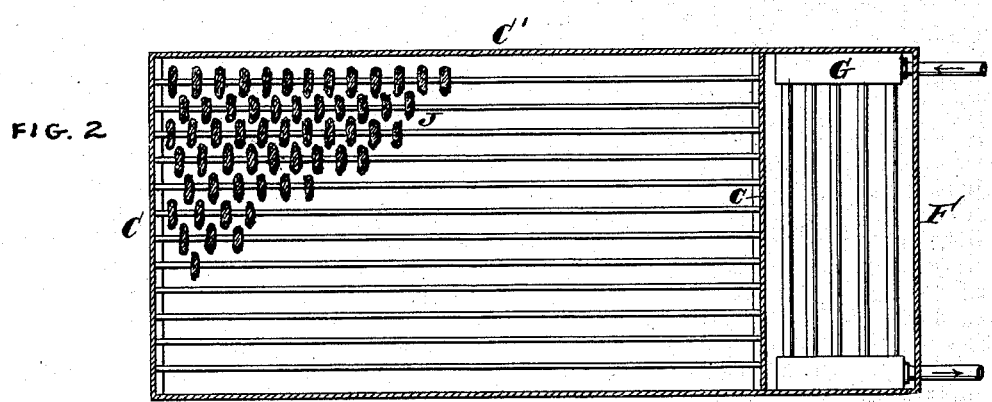
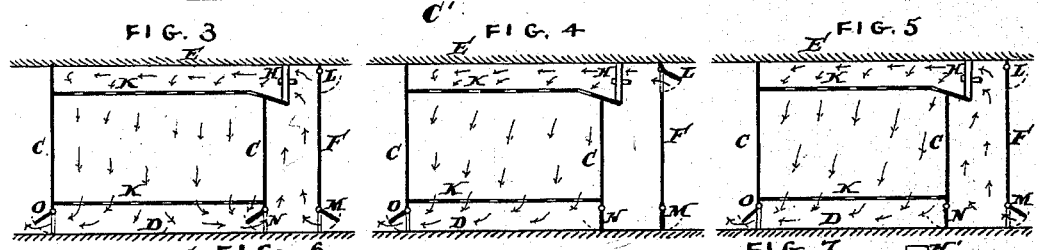
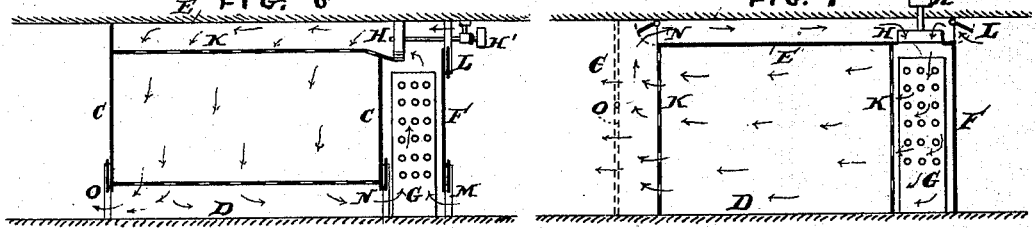
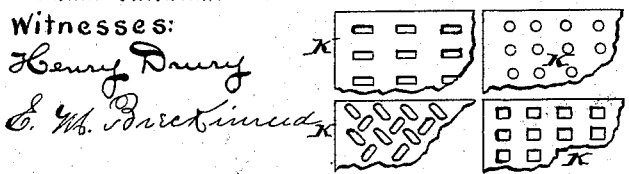
Witnesses:
Henry Drury
E. W. Breckinredge
Inventors:
J. H. Knowles
and
J. K. Proctor
by their Attorney

UNITED STATES PATENT OFFICE.

JOHN HENRY KNOWLES AND JOSIAH K. PROCTOR, OF PHILADELPHIA, PENNSYLVANIA, ASSIGNORS TO THE PHILADELPHIA TEXTILE MACHINE COMPANY, OF SAME PLACE.

DRYING-MACHINE.

SPECIFICATION forming part of Letters Patent No. 410,110, dated August 27, 1889.

Application filed November 17, 1888. Serial No. 291,181. (No model.)

*To all whom it may concern:*

Be it known that we, JOHN HENRY KNOWLES and JOSIAH K. PROCTOR, both of the city and county of Philadelphia, and State of Pennsylvania, have invented Improvements in Drying-Machines, of which the following is a specification.

Our invention relates to drying-machines; and it consists of certain improvements which are fully set forth in the following specification, and shown in the accompanying drawings, which form part thereof.

Our invention relates to that class of drying apparatus in which the air is forced or drawn through or among the material to be dried by means of air forcing or exhausting mechanism.

Our invention is not confined to the drying of any particular kind of material, but relates with equal pertinence to any matter which can be so distributed through the drying-room as to provide numerous air-spaces more or less uniformly disposed throughout the room.

The objects of our improvements are to distribute the air directly and evenly through the drying-room on all sides of the material to be dried, whether it is in layers on racks or screens with air-spaces between, as coffee, grain, sugar, &c.; hanging on supports, as yarn, skins, hides, &c., or piled or crated with vertical or horizontal air-spaces, as bricks, tiles, lumber, &c., and by an arrangement of passages provided with doors or gates to regulate the temperature and humidity of the air in the drying-room at will, as is hereinafter more fully described.

In carrying out our invention we provide the drier with diametrically-opposite perforated barriers, between which the materials to be dried are disposed. The parts within the drying-room exterior to these barriers are connected, respectively, by passage-ways with a heater and a blower or fan, which are also connected with each other by a short passage-way. The drying-room is provided with valves to control the discharge from the drying-room to the atmosphere exterior to the apparatus and to the heater, and also with a valve to admit air to the suction side of the blower without passing through the drying-room. This enforced distribution of the air is of great advantage in drying loosely or irregularly placed goods, as the air passes through the room in the most direct or open course when thrown in volume through an open passage, and goods placed out of the line of that course are imperfectly dried, while goods placed directly in the course of the air are overdried.

Our improvements are not limited in their application to any particular kind or style of drying-room; but they may be applied to any drying-room the construction of which will permit of their introduction.

In the drawings, Figure 1 is a vertical longitudinal sectional view of a drying-room to which our invention is applied. Fig. 2 is a horizontal sectional view through the line *x x* of Fig. 1. Figs. 3, 4, 5, and 6 are sectional outline views, on a reduced scale, illustrating different adjustments of the doors to control the circulation of the air-currents. Fig. 7 is a similar view of a modification of my invention, and Fig. 8 is a view of modifications of the obstruction or barrier.

In all the figures the same letters of reference refer to similar parts, and the arrows show the dirrection of the air-currents.

C C are the end walls, C' C' the side walls, D the floor, and E the top, of the drying-room.

F is the wall forming the end of the heater-room.

G is the heater, which may be a coil, as shown, or any other suitable device.

H is the fan or blower, and H' the shaft or pulley for driving it.

In Figs. 1 and 2 is shown material J J hanging to be dried, represented in this case as yarn.

K K are the distributing barriers or obstructions. In the drawings this barrier is shown either as a horizontal sub-ceiling or sub-flooring or as a vertical partition, (see Fig. 7,) according to the direction in which the current has to be moved to suit the nature of the material to be dried. In the drawings this barrier has been shown on both top and bottom or on both ends of the drying-room; but in many cases a double barrier will not be needed, and a single barrier, either top or bottom, or on the end next to the fan or on the end opposite to the fan, will be all that will be required. The openings in these barriers or obstructions K K for the passage of the air may be of any desired shape or pattern in continued slots transversely or longitudinally arranged, or round, square, or oblong holes variously disposed, as shown in Fig. 8.

L, M, N, and O are doors or gates for controlling the direction of the course of the air. These doors or gates are preferably hinged doors opening upward; but they may be constructed as gates sliding vertically, as shown in Fig. 6. The manner in which the gates or doors are made to operate is no part of this invention; but they may be made to operate and be adjusted by any proper mechanical means. The doors L and M control inlet, the door O outlet, and the door N communicating passages. In drying yarn and similar goods we prefer to have the doors arranged as shown in Figs. 1, 3, and 4, which show the doors as adjusted in the successive stages of the drying operation. On first placing the yarn in the drier the doors are adjusted as shown in Fig. 1 and the air simply recirculated—that is, passed over and over through the heater. This stage is for the purpose of rapidly increasing the heat in the drier. After the air is sufficiently heated and charged with moisture the doors are adjusted as shown in Fig. 3, part of the air being allowed to pass out of the drying-room at O, and fresh air being admitted at M. During this stage part of the air is also allowed to recirculate. This stage is continued until the drying is completed. After the drying is completed it is desired to rapidly cool off the room, so as to make it comfortable for the workmen to enter and recharge it. For this purpose the doors are adjusted as shown in Fig. 4, and only cold air from outside of the heater is thrown into the drier.

It will be seen that by a proper and careful adjustment of the several doors any desired degree of temperature, from that outside of the drier to that of the pipes of the heater itself, may be maintained in the drying-room, the coolest temperature in the drier being where the doors are adjusted as shown in Fig. 4, and the highest when adjusted as shown in Fig. 1.

With many kinds of materials too rapid drying tends to injure the goods, and with other materials the presence of a certain quantity of damp or humidity in the air is necessary to secure the best results. By our method of recirculating the air any desired degree of humidity may be maintained in the drying-room, the greatest degree being secured when the doors are adjusted as shown in Fig. 1 and the moisture extracted from the goods retained in the air in the drier. A greater degree of dryness is attained by wasting freely at O, and the greatest dryness by fully opening the doors O and M, the other doors being closed, as in Fig. 5. The temperature and humidity may also be regulated without the use of an opening at M. In this case the air will enter at L and part will escape through the door O, while part will recirculate through the door N and heater G, which may be regulated by the adjustment of these doors.

In cases of drying where it is not necessary to control the humidity of the air, but where a nice adjustment of temperature is desired, the door N may be dispensed with and the doors L and M only be retained, the opening at N being permanently closed and the opening at O being left permanently open. By proper adjustment of the doors L and M perfect control is had over the temperature of the air. When L only is open, only cold air is admitted to the drier, and when M only is open only hot air is admitted to the drier, and by having each door L and M partly open a mixture of hot and cold air is admitted. By this method of regulating the temperature of the air in the drier more rapid changes and a nicer adjustment of the temperature can be secured than can be attained by regulating the heater, and at all times the quantity of air passing through the drying-room will be the same. Where nice control of neither the temperature nor humidity is desired, all the doors may be dispensed with and openings left only at M and O, as in Fig. 5. In cold-air drying no heater and no doors would be required, the air simply passing through the fan and drier, as in Fig. 4.

In Fig. 7 the barriers or obstructions K K are vertical at the ends of the room, and the air passes directly through the drier. The dotted lines show a passage for returning the air to the heater when it is desired to have the air recirculate. In this modification the air passes through the heater G after it leaves the fan or blower H, and no air can pass through the drier except that which is first passed through the fan or blower. If the rear partition (dotted at C) is used, it may have an exit-door O for the air.

In carrying out our invention the fan may be placed upright, as shown in Fig. 1, or it may be laid flatwise, as shown in Fig. 9, and it may be in any position as regards the drying-room. There may be two or more fans operating at the same time. The fans may either force the air into or exhaust the air out of the drying-room, or one fan or set of fans may force the air into while another fan or set of fans may simultaneously exhaust the air out of the drier. The heater may be placed so as to have the air drawn through it, as shown in Fig. 1, or forced through it, as shown in Fig. 7, and it may be placed at the end of the drier, or in any other desired position. The drier itself may consist of one room only, as shown in the drawings, or it may consist of two or more rooms placed horizontally or vertically as regards one another, with the air furnished by the same fan or set of fans.

It is apparent that the fan may be replaced by any other satisfactory means to circulate the air. It is manifest that the mere details of construction which are here shown may be varied in many ways without departing in the least from the principles of our invention, and we do not limit ourselves thereto.

Having now described our invention, what we claim as new, and desire to secure by Letters Patent, is—

The combination, in a drier, of the drying-room having diametrically-opposite sides formed with perforated barriers, a blower, a heater, passage-ways connecting the parts of the drying-room exterior to the two barriers respectively with the heater and with the blower, a short connecting-passage between the heater and the blower, valves to control the discharge from the drying-room to the atmosphere exterior to the apparatus and to the heater, and a valve to admit air to the suction side of the blower without passing through the drying-room.

In testimony of which invention we hereunto set our hands.

JOHN HENRY KNOWLES.
JOSIAH K. PROCTOR.

Witnesses:
JOSEPH P. COBB,
JAMES F. KOHL.